Aug. 24, 1937.   A. R. JOHNSON   2,090,980
CULTIVATOR ATTACHMENT FOR TRACTORS
Filed Nov. 7, 1936   2 Sheets-Sheet 1
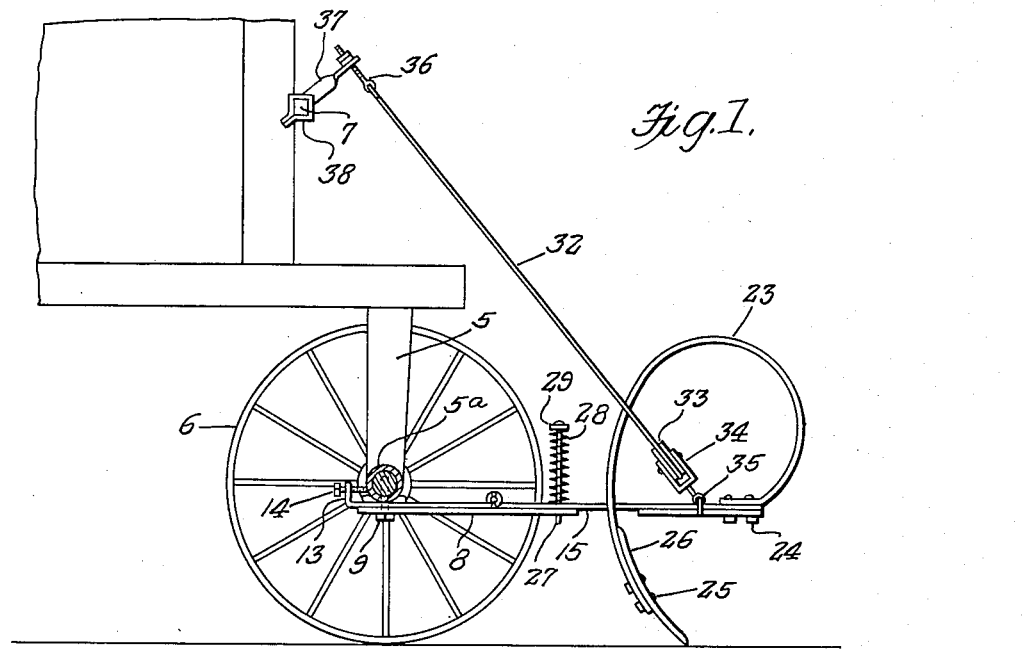
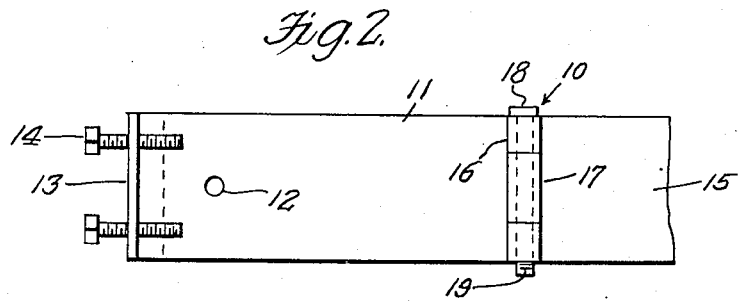
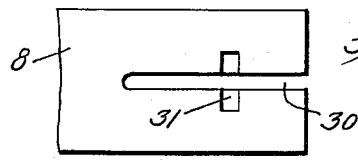
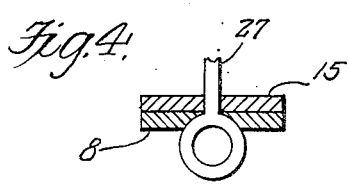
Inventor
Arthur R. Johnson,
By Clarence A. O'Brien
Hyman Berman
Attorneys Aug. 24, 1937. A. R. JOHNSON 2,090,980
CULTIVATOR ATTACHMENT FOR TRACTORS
Filed Nov. 7, 1936 2 Sheets-Sheet 2

Inventor
Arthur R. Johnson,

By Clarence A. O'Brien
Hyman Berman
Attorneys

Patented Aug. 24, 1937

2,090,980

UNITED STATES PATENT OFFICE 2,090,980

CULTIVATOR ATTACHMENT FOR TRACTORS

Arthur R. Johnson, Clinton, Iowa

Application November 7, 1936, Serial No. 109,771

1 Claim. (Cl. 97—47)

This invention relates broadly to cultivators and more particularly to a cultivator in the form of an attachment adapted to be readily mounted on the front of a tractor for cultivating the ground in advance of the front wheels of the tractor.

The invention together with its objects and advantages will be best understood from a study of the following description taken in connection with the accompanying drawings wherein:—

Figure 1 is a side elevational view illustrating the application of the attachment, and with the near front steering wheel of the tractor removed.

Figure 2 is a fragmentary top plan view of the hinge forming part of the attachment.

Figure 3 is a fragmentary bottom plan view of a plate forming part of the attachment.

Figure 4 is a fragmentary detail sectional view showing the manner of securing the hinge parallel to the attachment plate as will be hereinafter more fully referred to.

Figure 5:
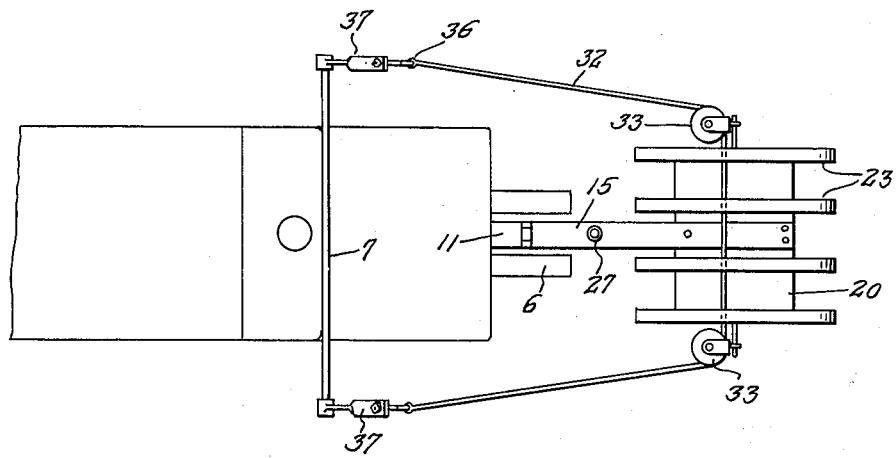
Figure 5 is a top plan view illustrating the application of the attachment.

Referring to the drawings by reference numerals it will be seen that 5 indicates generally the steering post of a conventional tractor while 6 indicates one of the front steering wheels of the tractor.

The tractor is also shown as being provided at the front thereof with a power lift arm 7.

The attachment per se, in the preferred embodiment thereof, comprises an attachment plate 8 which adjacent one end is secured to the axle housing portion 5a of the steering post 5 through the medium of a bolt 9.

The plate 8 supports a hinge 10.

The hinge 10 includes a leaf 11 that rests flatly on the attachment plate 8 and at one end is provided with an opening 12 to accommodate the bolt 9 which secures the plate 8 to the steering post 5 as previously explained.

At said end the hinge leaf or plate 11 is also provided with an upstanding flange 13 that is threadedly apertured to accommodate screws 14. The screws 14 are adapted to be threaded home against the axle housing portion of the steering post 5 in a manner to secure the plate 8 and hinge 11 against lateral swinging movement in a horizontal plane between the steering wheels 6 and thereby to positively secure the plate 8 and hinge 10 of the attachment at the front of the tractor to extend forwardly from the tractor. Further the hinge 10 includes a leaf or plate 15 that is provided at one end with sleeves or eyes 16 that align with a sleeve or eye 17 provided at the free end of the hinge leaf or plate 11 to accommodate a hinge bolt 18. The bolt 18 is secured in place through the medium of a cotter pin 19. Such an arrangement it will be appreciated, will permit the hinge leaf or plate 15 to be readily and quickly separated from the hinge plate or leaf 11.

Secured transversely to the free end of the hinge leaf or plate 15 and extending laterally thereof is a broad flat plate 20, the same being secured to the free end of the hinge leaf or plate 15 through the medium of bolts or other suitable fastening elements 21.

Figure 6:
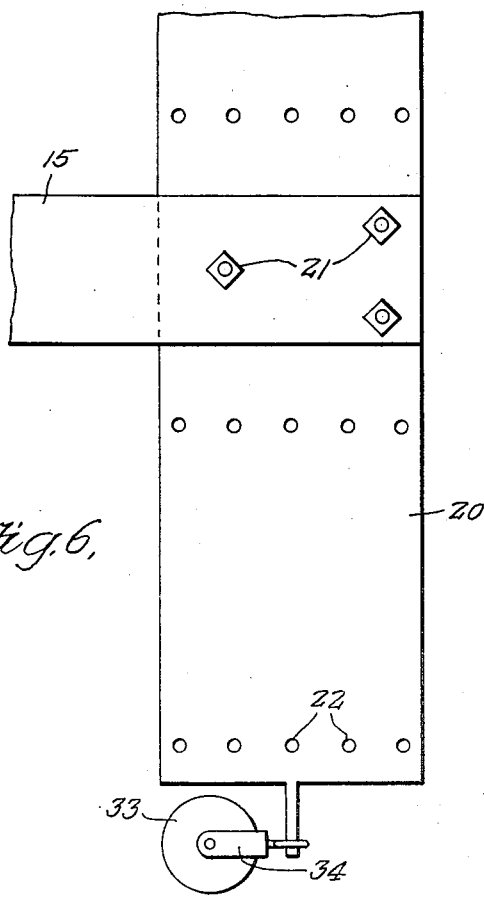
Figure 6 is a top plan view of the free hinge leaf and the shank carrying plate associated therewith.
Figure 7:
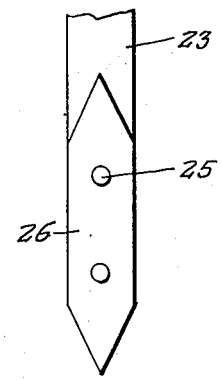
Figure 7 is an elevational view of a portion of a shank showing a tool or shovel mounted thereon.

The plate 20 is provided, in the present instance, with four rows of relatively spaced openings 22 there being two center rows spaced adjacent to the transverse center of the plate 20 and two end rows placed adjacent the respective opposite end edges of the plate 20 as will be clear from a study of Figures 5 and 6.

Thus the plate 20 is provided for the attachment thereto in an adjustable manner, of a series, in the present instance, four substantially C-shaped shanks 23 of strap iron or other suitable material, the shanks 23 being provided at one end with apertures adapted to align with selective openings 22 to accommodate bolts or similar fastening elements 24 through the medium of which the shanks 23 are secured to the plate 20 at the desired adjustment between the longitudinal edges of the plate.

The shanks 23 have detachably secured to the free ends thereof through the medium of bolts or other fastening elements 25 earth working tools 26.

In the present instance the earth working tools 26 are respectively shown as having the form of a bowed or longitudinally curved shovel pointed at its respective opposite end whereby either end of the shovel may be brought into use.

In actual practice it will be found that the shovels for earth working tools 26 will serve to level the ground in advance of the front wheels of the tractor to the end that faster plowing and smoother cultivation may be obtained.

For releasably holding the hinge leaf or plate 15 down against the attachment plate 8 and consequently the earth working tools 26 in proper ground engaging position, there is provided an eye bolt 27 that extends through an opening provided therefor in the hinge leaf or plate 15 and has confined thereon a spring 28 one end of which bears against a nut 29 on the upper free end of the bolt, and the other end of which bears against the hinge leaf or plate 15.

The eye or head of the bolt 27 is accommodated within a longitudinal slot 30 provided in the forward end of the plate 8, and at opposite sides of the slot plate 8 on its under side is grooved as at 31 to receive the head of the bolt 27 when the bolt has been turned to place said head transverse to the longitudinal dimensions of the hinge leaf or plate 15. With the head of the bolt 27 thus engaged in the grooves 31 the bolt 27 is secured against accidental turning movement to a position as would permit the head of the bolt working through the slot 30.

Thus it will be seen that when it is desired to remove the hinge 15 and associated parts of the attachment from the tractor all that is necessary is to turn the bolt 27 so that the head thereof may pass through the slot 30, or in other words turn the head of the bolt to a position at right angles to the position of the bolt illustrated in Figure 4; remove the hinge pin 18, and then the hinge plate 15 is readily separated from the hinge plate 11 and the attaching plate 8.

It will be understood that the power arm 7 which is journaled at the front of the tractor forms part of the usual power lift mechanism of a corn cultivator or plow.

To the end that the attachment may be raised for lifting the shovels 26 out of ground engaging position incidental to the lifting or raising of the corn plow (not shown) there is provided a connection between the power arm 7 and the attachment so that as the arm 7 swings upwardly incidental to the lifting of the corn plow hinge leaf 15 and associated parts will move upwardly, the hinge leaf 15 swinging vertically upwardly about its hinge pin 18.

In the present instance the connection between the attachment and the power lift arm 7 is in the form of a cable 32 that is trained over pulleys 33 journaled in brackets 34 loosely mounted at the respective opposite ends of the plate 20 as indicated generally at 35.

The respective opposite ends of the cable 32 are provided with eye bolts 36 that are suitably engaged with arms 37 that are clamped or otherwise secured as indicated generally at 38 to squared portions of the power lift arm 7. Thus it will be seen that as the arm 7 is rocked in a counter clockwise direction as will take place incidental to a raising or lifting of the corn plow a pull will be exerted on the cable 32 for causing the hinge leaf or plate 15 and its associated parts including the tools 26 to swing vertically upwardly to move the shovels or tools 26 out of ground engaging position.

It is thought that a clear understanding of the construction, utility and advantages of an invention of this character will be had without a more detailed description.

Having thus described the invention, what is claimed is:—

The combination with a tractor including a steering post for the front wheels thereof and a power lift, of an attaching member secured to the steering post and extending forwardly therefrom, a plate, hinge means connected with the plate, said attaching member and the steering post for supporting the said plate forwardly of the steering wheels of the tractor, a plurality of shanks, means for securing each of said shanks at the desired adjustment to the said plate, shovels on the free ends of said shanks, pulleys loosely mounted on the said plate at the respective opposite ends of the latter, arms secured to the shaft of the power lift, and a cable trained over said pulleys and having its respective opposite ends connected with said arms.

ARTHUR R. JOHNSON.